Patented July 20, 1943

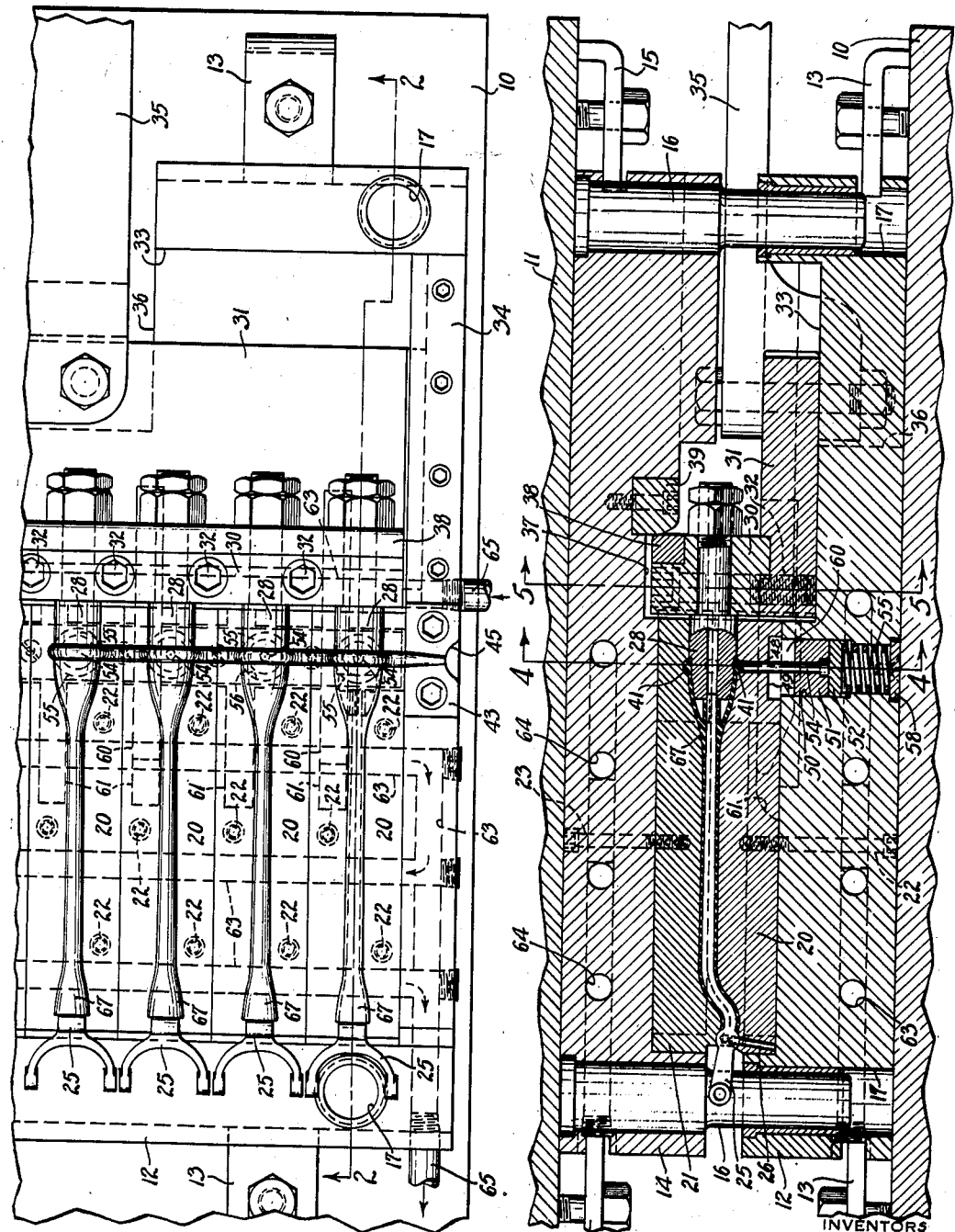

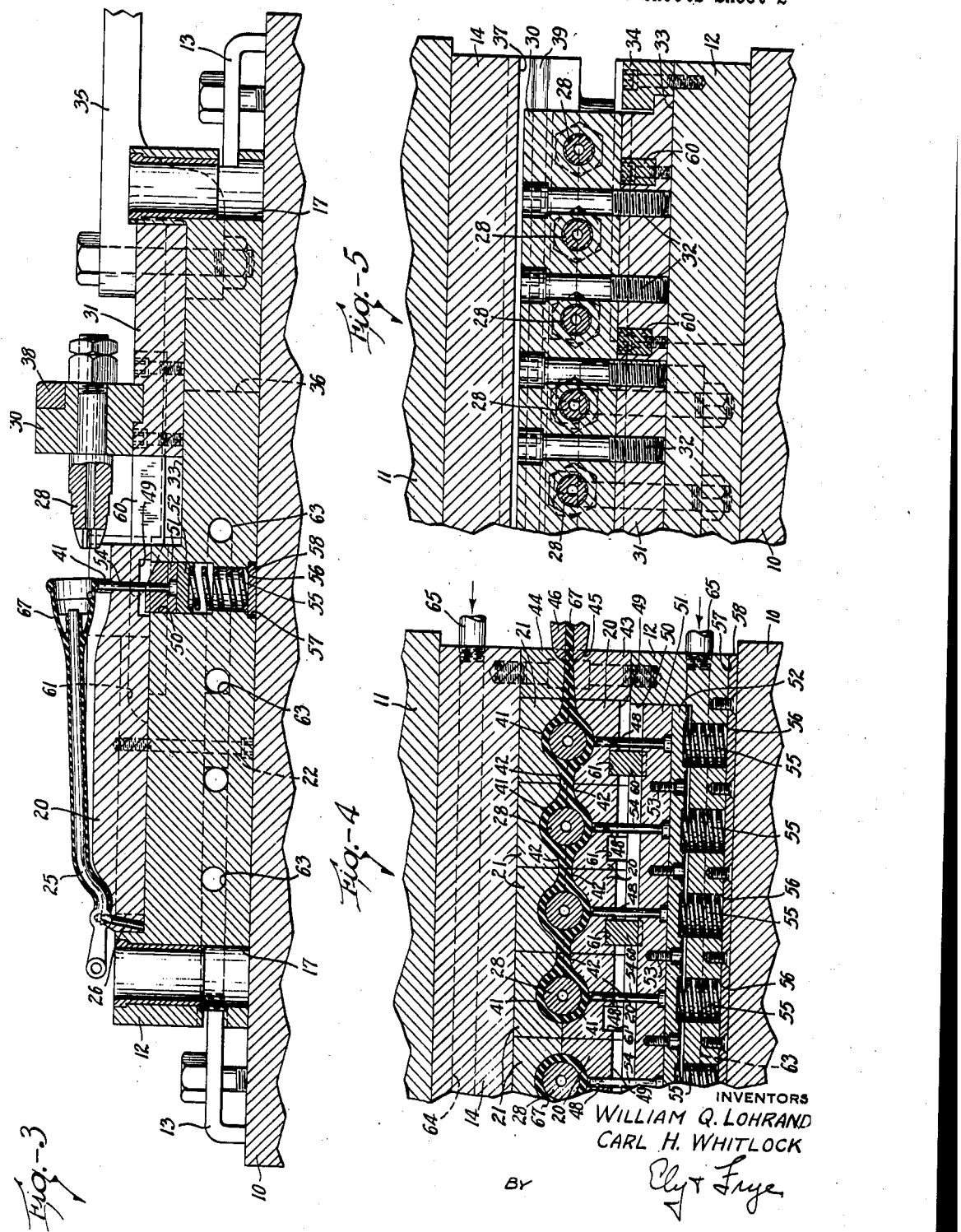

2,324,978

UNITED STATES PATENT OFFICE 2,324,978

METHOD OF MOLDING PLASTICS

William Q. Lohrand, Barberton, and Carl H. Whitlock, Akron, Ohio, assignors to The Firestone Tire & Rubber Company, Akron, Ohio, a corporation of Ohio Application January 9, 1940, Serial No. 313,076

2 Claims. (Cl. 18—59)

This invention relates to methods of molding plastics, and more especially it relates to improved procedure for producing articles such as have a rigid core entirely covered with hardened plastic composition.

The invention, for purposes of illustration, is shown and described herein in its application to the manufacture of small gear-shift levers such as are mounted upon the steering posts of some motor vehicles, which levers comprise a metallic core. In the manufacture of articles of the character mentioned, difficulty has been encountered in obtaining uniformity of thickness of the plastic cover on the core, and it is to the solution of this problem that this invention primarily is directed.

The chief objects of the invention are to provide an improved method of molding plastic covers of uniform wall thickness upon metal cores; and to provide a method of making articles of the character mentioned wherein the core is completely concealed except at one end thereof. Other objects will be manifest as the description proceeds.

Of the accompanying drawings:

Figure 1 is a fragmentary plan view of the lower half of a mold embodying the invention, and the work therein;

Figure 2 is a longitudinal section of the complete mold, taken on the line 2—2 of Figure 1, showing the mold in closed, molding condition.

Figure 3 is a section similar to Figure 2, of the lower half of the mold, showing the work being ejected therefrom;

Figure 4 is a section on the line 4—4 of Figure 2; and

Figure 5 is a section on the line 5—5 of Figure 2.

Referring now to the drawings, there is shown at 10 the lower platen and at 11 the upper platen thereof, which press may be of the hydraulic type, the lower platen usually being stationary and the upper platen usually being movable toward and away from the lower platen. Mounted upon the lower platen 10 is the bed plate 12 of the lower half of a mold, said bed plate being secured to said platen by a plurality of clamps 13, 13. In like manner the upper bed plate 14 of the mold is secured to the upper platen 11 by clamps 15, 15. Dowel pins 16, 16 mounted in the upper bed plate 14, at the respective corners thereof, project downwardly therefrom and are receivable in bushed bores 17 in the lower bed plate 12 for the purpose of effecting accurate registry of the upper and lower sections of the mold.

The molds in which the plastic composition is applied to the metallic cores each comprise a lower mold section 20 and an upper mold section 21, said sections being separable along a non-planar parting line determined by the shape of the article to be molded. In this instance, each mold section includes one-half of the molding cavity, as is common practice in the art. The lower mold sections 20 are secured to the lower bed plate 12 by cap screws 22, 22, and the upper mold sections 21 are similarly secured to the upper bed plate 14 by cap screws 23, 23. In Figure 1 are shown four of the lower mold sections 20, which constitute one-half of the total number of lower mold sections in the entire structure. The mold sections are disposed side by side in laterally abutting relation, and constitute two groups, of four each as shown, which groups are disposed on opposite sides of the longitudinal center line of the apparatus. Each pair of upper and lower mold sections comprises a molding cavity in which is receivable a metal core structure 25 about which plastic composition is to be molded. The molding cavity is open at both ends, the left end thereof, as shown in the drawings being open to enable one end of the core structure 25 to project from the molding cavity and from the mold for the reason that no plastic is to be molded thereon. Exteriorly of the molding cavity each lower mold section 20 is provided with an upstanding stud 26 that is loosely receivable in a bore normally formed in the core member 25, the arrangement being such as to assist in holding the core in proper position during a molding operation.

It is important that the cores 25 be accurately positioned within the molding cavities, in spaced relation to the walls thereof, and to this end means is provided for supporting the right hand end of each core. Said means comprises axially apertured plugs 28, 28 that enter the open, right hand ends of the respective molding cavities and close the same, the core members 25 being received in the axial bores of the respective plugs, to be supported thereby. Thus each core member is provided with two-point support. The nose portions of the plugs 28 are disposed in spaced relation to the walls of the molding cavities, the arrangement being such as to effect the molding of a hollow portion on the right hand end of each article, which hollow portion subsequently becomes the hand-grip portion of the article.

At their rear ends the several plugs 28 are secured in an upstanding supporting block 30, the latter being mounted upon the forward end of a slide 31 and secured thereto by means of set screws 32, 32. The slide 31 is mounted in a slideway consisting of a transverse recess 33 formed in the top face of the bed plate 12, and gibs, such as the gib 34, are provided at opposite sides of the slideway for retaining the slide 31 therein. Reciprocation of the slide 31 is effected by means of a pitman 35 that is connected at one of its ends to the middle of the slide at the rear thereof, the other end of said pitman being connected to any suitable means (not shown) for imparting reciprocatory movement thereto. The end of the pitman 35 that connects to the slide 31 is forked, and the bed plate 12 is cut away at 36 to accommodate this portion of the pitman. To assure accurate positioning of the slide and the supporting block 30 in the closed position of the mold, the upper bed plate 14 is recessed at 37 to receive the upper marginal portion of said supporting block. The upper rear corner of the supporting block 30 is provided with a hardened wear plate 38, and the rear wall of the recess 37 is provided with a hardened wear plate 39, the latter being engageable with wear plate 38 to force the supporting block 30 and slide 31 forwardly to determinate position during the closing of the mold, if the pitman 35 has not done so. The adjacent corners of the wear plates 38, 39 are rounded as shown to facilitate operative engagement of the two plates.

At the right hand extremity of each molding cavity, the upper and lower mold sections are provided with respective relatively deep grooves 41, 41, which grooves are in communication with the molding cavities, and the grooves of each mold are in communication with the grooves of an adjacent mold or molds through the agency of gates 42, 42, whereby a plurality of molds may be charged with fluent molding material from a single source. As shown, the molds are so gated as to constitute two units of four molds each, the respective units being arranged to be charged from opposite sides of the press. Mounted beside the outermost mold sections 20, 21 are blocks 43, 44 respectively into which the gate-grooves 42 are extended, said gate-grooves opening into a recess or concavity 45 formed in the outer face of the blocks 43, 44 at the line of juncture of the latter when the press is closed. The recess 45 constitutes a socket in which the nozzle of a plastic-injection apparatus is receivable, for the injection of plastic composition into the gated molds, a portion of such a nozzle being shown at 46, Figure 4. It will be understood that another pair of blocks similar to the blocks 43, 44 are similarly provided on the other side of the press for the other group of molds.

It is desirable in apparatus of this type to provide for the automatic ejection of the finished work, and to this end each of the lower mold sections 20 is formed with a vertical bore 48 extending downwardly from the groove 41 therein to a relatively wide slot 49 extending transversely of the bottom face of the mold section. Below the mold sections 20 the bed plate 12 is formed with a transversely extending slot 50 that is disposed directly below the slots 49 of the mold sections, and slidably mounted for up and down movement in slot 50 is an ejector bar comprising an upper ejector plate 51 and lower ejector plate 52, which plates are secured together by screws 53, 53. Extending upwardly through ejector plate 51 are ejector pins 54, 54 that are disposed in the respective bores 48 of the mold sections 20, and extend substantially to the grooves 41 therein. The pins 54 are removably secured in place by means of heads on their lower ends, which heads are confined between the plates 51, 52. The ejector structure normally is urged upwardly by a plurality of compression springs 55, 55 that are in axial alignment with pins 54, and which are disposed in respective bores 56 extending from the bottom of the slot 50 to a groove 57 extending transversely of the bed plate 12, there being a plate 58 mounted in groove 57 to retain said springs in place.

The ejector structure is arranged to rise and to be depressed in timed relation to the movement of the slide 31, and to this end the latter has a plurality of fingers 60, 60 projecting forwardly therefrom, at a lower level than the plugs 28. The fingers 60 extend into respective grooves or recesses 61 formed partly in the lower mold sections 20 and partly in the bed plate 12. Although each mold section 20 is formed with such a groove, the number of fingers employed is only half the number of the molds. The arrangement is such that the fingers 60 extend across the slot 50 in the bed plate 12, over the upper ejector plate 51, and thus serve to hold the ejector mechanism in depressed position, against the force of the springs 55, in the closed or molding position of the apparatus as shown in Figure 2. The nose portion of each finger 60 is sloped or tapered on its bottom face, and the top face of the ejector plate 51 is sloped or beveled rearwardly, the arrangement being such that the ejector mechanism is enabled to rise, under the impetus of springs 55, when the slide 31 is in its rearward or retracted position as shown in Figure 3, the fingers, however, maintaining their positions over and in engagement with the plate 51 at all times.

The bed plates 12 and 14 of the mold are provided respectively with the usual ducts or passages 63, 64 therein, through which passages a cooling fluid is circulated to effect the rapid hardening of the plastic composition in the molding cavities. Suitable pipes such as shown at 65, Figures 1 and 4, are provided for delivering cooling fluid to the ducts 63, 64 and for conducting it therefrom.

The operation of the apparatus is as follows. With the upper platen 11 of the press in elevated position, the several core structures 25 are mounted in the molding cavities of the lower mold sections 20 by engaging one end of each core structure with the axial aperture of one of the plugs 28 and then moving the other ends of the core structures downwardly so that the studs 26 engage with respective bores formed near that end of each core structure. Note that the studs 26 and 28 support the core structures so that they are in spaced relation to the walls of the molding cavities formed in the lower mold section and so that they do not contact the upper mold sections 21 when they are moved down on the lower mold sections. The upper platen 11 is then lowered to move the upper mold sections 21 downwardly into making relation with the lower mold sections 20, thus confining the core structures 25. Thereafter the nozzle 46 is fitted into the socket 45 in the blocks 43, 44, and fluent plastic composition is spewed therefrom, which composition flows to all the mold cavities of a molding unit by reason of the gated construction of the molds. The plastic composition is designated 67 in the drawings. Cooling fluid, usually cold water, circulating through the ducts 63, 64 of the bed plates 12, 14 quickly cools and hardens the plastic composition 67.

After the plastic composition has hardened, the mold may be opened, this being accomplished first by lifting the upper platen 11 and with it the upper mold sections 21, and then moving the slide rearwardly to the retracted position shown in Figure 3, and thus to withdraw the plugs 28 from the molded articles. As the slide 31 is retracted, the fingers 60 carried thereby move likewise, and as their tapered nose portions move into contact with the beveled face of the upper ejector plate 51, the ejector structure is enabled to rise under the impetus of the springs 55. This elevates the ejector fingers 54, the upper ends of which move into the respective grooves 41 in the lower mold sections 20, and by engagement with the hardened plastic composition 67 in said grooves, effect the lifting of that end portion of each of the molded articles from the lower molding cavity, the opposite ends of the articles pivoting about the studs 26. The articles are then readily removed from the molds as a unit, there being four articles to each unit, which articles are united at one end by reason of the gated construction of the molds. This completes a cycle of operation that may be repeated as often as desired, it being understood that the slides 31 are moved forwardly, which retracts the ejector pins 54, before commencing the new cycle of operation.

The several articles of each molded unit of articles are separated from each other by the removal of the annular terminal ribs or beads formed by the molding grooves 41 and the gates 42 therebetween. Subsequently the cavity or hollow formed in the end of each article by the plugs 28 is closed by means of a cap (not shown) that is secured in place by any suitable adhesive. Thus the hollow bulbous end of the article constitutes a hand-grip portion in the finished structure.

The invention enables the production of plastic-covered cores with the latter accurately positioned within the finished structures, and achieves the other advantages set out in the foregoing statement of objects.

Modification may be resorted to without departing from the spirit of the invention, or the scope thereof as defined by the appended claims.

What is claimed is:

1. The method of molding portable reinforced plastic articles which comprises supporting a reinforcing member in a mold cavity in spaced relation to the wall thereof by engagement of the mold with opposite ends of said member, filling the mold cavity to cover the reinforcing member with plastic material and forming the latter with an open hollow bulbous portion about and beyond one end at least of said reinforcing member, removing the molded structure from the mold, and then capping said open bulbous portion to enclose and conceal the end of the reinforcing member therein.

2. The method of molding portable reinforced plastic articles which comprises supporting a reinforcing member in a mold cavity in spaced relation to the wall thereof by engagement of the mold with opposite ends of said member, filling the mold cavity to cover the reinforcing member with plastic material and forming the latter with an open hollow bulbous portion about and beyond one end at least of said reinforcing member, removing the molded reinforced structure from the mold, and then mounting a preformed cap over the opening in the bulbous portion to close the same and conceal the end of the reinforcing structure within the hollow interior thereof.

WILLIAM Q. LOHRAND.
CARL H. WHITLOCK.

CERTIFICATE OF CORRECTION.

Patent No. 2,324,978.   July 20, 1943.

WILLIAM Q. LOHRAND, ET AL.

It is hereby certified that error appears in the printed specification of the above numbered patent requiring correction as follows: Page 1, first column, line 39, after the word "platen" first occurrence, insert --of a press--; and second column, line 52, for "hand-grid" read --hand-grip--; page 2, second column, line 66, for "making" read --mating--; and that said Letters Patent should be read with this correction therein that the same may conform to the record of the case in the Patent Office.

Signed and sealed this 24th day of August, A. D. 1943.

(Seal)

Henry Van Arsdale,
Acting Commissioner of Patents.